United States Patent [19]

Meyer

[11] 4,009,761
[45] Mar. 1, 1977

[54] SKID STEER VEHICLE
[75] Inventor: Gustave Meyer, Northglenn, Colo.
[73] Assignee: Irvin L. Stumpf, Wheat Ridge, Colo.; a part interest
[22] Filed: May 2, 1975
[21] Appl. No.: 573,867
[52] U.S. Cl. .................................. 180/6.2; 180/22
[51] Int. Cl.² ...................................... B62D 11/02
[58] Field of Search ............ 180/6.2, 21, 22, 6.48
[56] References Cited
UNITED STATES PATENTS

| 1,197,526 | 9/1916 | Mesecke | 180/21 |
| 3,166,141 | 1/1965 | Shields et al. | 180/6.2 X |
| 3,444,837 | 5/1969 | Donofrio | 180/6.2 UX |
| 3,572,454 | 3/1971 | Siren | 180/6.2 |

Primary Examiner—Joseph F. Peters, Jr.
Assistant Examiner—R. Schrecengost
Attorney, Agent, or Firm—MacGregor and Rost

[57] ABSTRACT

A loader or other vehicle provided with three pairs of wheels located as closely to each other as is practical while allowing a small space between the peripheral surfaces of adjacent wheels; the axles of the three pairs of wheels extending transversely of the vehicle, with the center axle located in a horizontal plane lower than the horizontal planes of the front and rear axles, providing four wheel traction at all times automatically utilizing either the combination of two front and two center wheels or the combination of two rear and two center wheels depending on whether the vehicle load is greater forwardly or rearwardly of the center axle.

1 Claim, 3 Drawing Figures

4,009,761

SKID STEER VEHICLE

BACKGROUND OF THE INVENTION

This invention relates to "skid steer" vehicles, such as motor powered loaders and other vehicles which preform their intended functions in restricted areas. Skid steer vehicles have wheels which cannot be turned in any direction for changing the path of travel; turning of the vehicle is done by making the wheels on one side travel forwardly and making the wheels on the opposite side travel rearwardly, resulting in a skid motion of the loader to change its direction of travel.

Loaders of this type have been designed to employ relatively short wheel bases supported on four relatively large diameter wheels, the wheel base permitting the vehicle to turn in cramped surroundings. Difficulties have been encountered in the operation of prior art skid steer vehicles due to the fact that differences in vehicle load forwardly or rearwardly of wheel base center causes the wheel traction to be confined to either the front wheels or the rear wheels of the four wheel drive. This results in raising one pair of wheels, either front or rear, so that the skid steering movement as well as single path travel depends on two wheel traction. Such prior art vehicles may employ two pairs of 29 inch diameter wheels, with the wheels of one pair spaced five inches from the wheels of the other pair. The resultant two wheel traction results in unstable and unsafe performance, and other objections such as digging of holes in the terrain.

SUMMARY OF THE INVENTION

The skid steer loader or other vehicle of this invention is provided with six wheels in which the three pairs of wheels are located as closely to each other as is practical while allowing a small space between the peripheral surfaces of adjacent wheels. The axle of the center pair of wheels is mounted on the vehicle frame in a lower horizontal plane than the axles of the front and rear pairs of wheels. This six wheel construction always provides a four wheel drive automatically alternately utilizing the combination of two front and two center wheels or the combination of two rear and two center wheels, depending on the load differential forwardly or rearwardly of the center axle. Four wheel traction is provided at all times in skid steering for turns as well as for single direction travel.

OBJECTS OF THE INVENTION

The main object of the invention is to achieve easy skid steering, stability of the vehicle, safe performance, increased capacity, and positive four wheel traction regardless of differences in weight of front and rear loads.

Another object is to provide four wheel traction at all times by automatic transmittal of the driving traction to the combined front and center pairs of wheels or to the combined rear and center pairs of wheels by a rocking motion of the vehicle.

Figure 1:
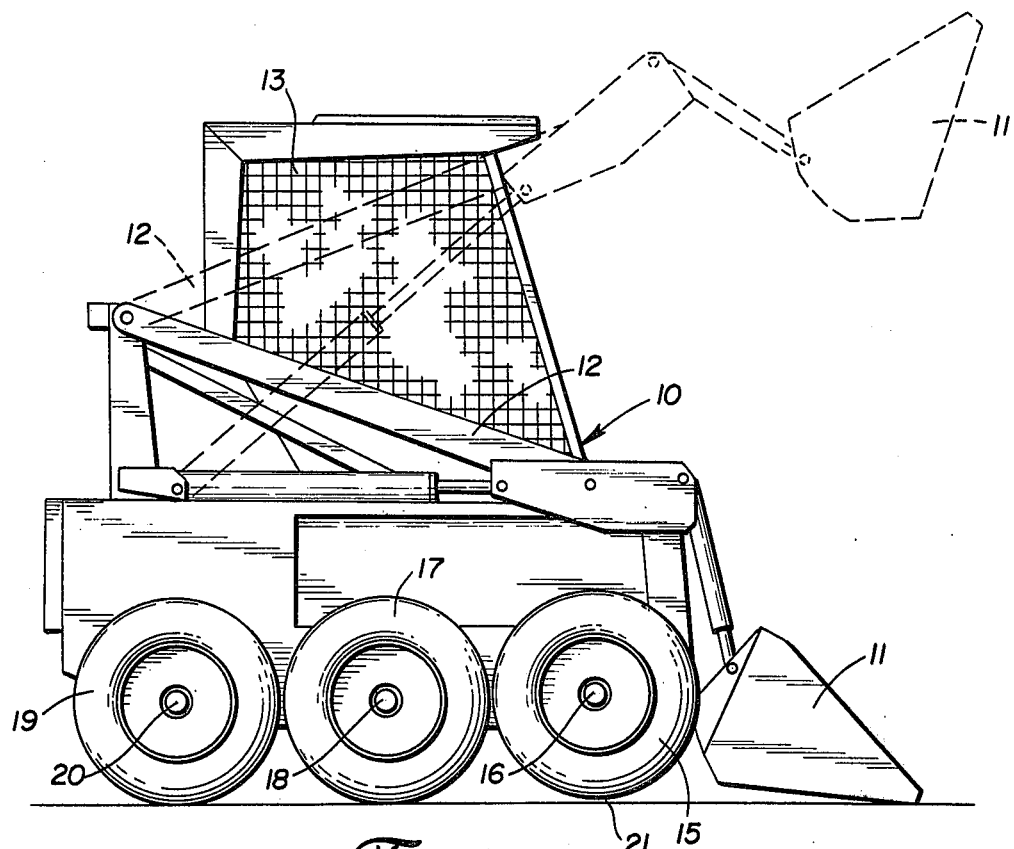
FIG. 1 is a side elevational view of a loader embodying this invention, showing the loader bucket and its operating mechanism in their lower position in solid lines and in raised position in broken lines, the vehicle load being greater in its rear portion than its front portion.

It is to be understood that left wheels of the vehicle are identical with the right wheels shown in the drawings when said left wheels are viewed from the left of the vehicle.

DESCRIPTION OF THE PREFERRED EMBODIMENT

The skid steer vehicle shown herein is a loader 10, provided with a bucket 11, loader arms 12 and cab 13. A pair of front wheels 15 are mounted on an axle 16; a pair of center wheels 17 are mounted on axle 18; and a pair of rear wheels are mounted on axle 20. Axles 16 and 20 are mounted transversely on the vehicle frame in the same horizontal plane, and axle 18 is mounted transversely on the vehicle frame between the front and rear axles in a horizontal plane lower than that of the axles 16 and 20. Thus, when the vehicle load is greater rearwardly of the axle 18, as in FIGS. 1 and 2, the wheels 17 and 19 bear on the ground or supporting surface and their axles 18 and 20, respectively, are in the same horizontal plane, while the front wheel axle 16 is raised and the wheel 15 is spaced from the supporting surface as indicated at 21. When the vehicle load is greater at its forward portion than rearwardly of the center axle, the front wheel 15 and center wheel 17 bear on the ground or supporting surface and their axles 16 and 18, respectively, are in the same horizontal plane, while the rear wheel axle 20 is raised and the wheel 19 is spaced from the supporting surface as indicated at 22.

Figure 2:
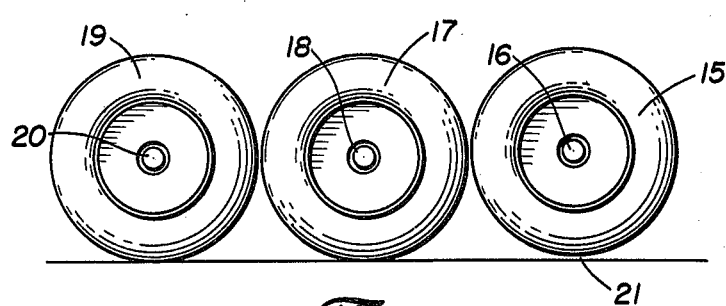
FIG. 2 is a side elevational view of the outer side of the three right wheels detached from the vehicle of FIG. 1.
Figure 3:
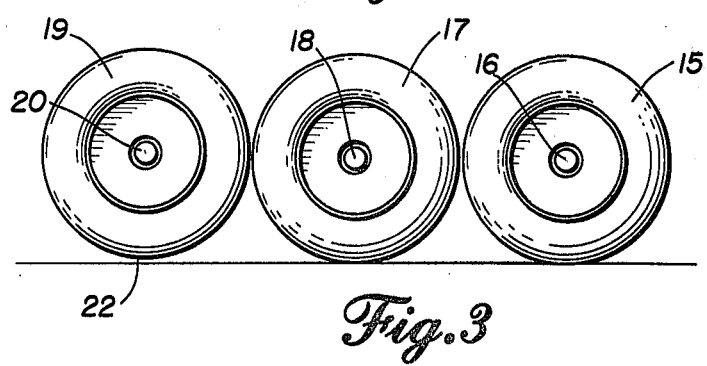
FIG. 3 is a view similar to FIG. 2, showing the raised position of the rear wheels above the ground or supporting level, as they appear when the vehicle load is greater at its front end than at its rear. When the vehicle is empty, its own weight usually is greater at the rear portion than at its forward portion.

Loaders, such as shown in FIG. 1, are heavier at their rearward ends when the bucket is empty than at the end forwardly of the center axle 18. Regardless of the disposition of the vehicle load, any variation between the weight forwardly and rearwardly of the center axle 18 automatically either raises the front axle 16 and wheels 15, or the rear axle 20 and wheels 19. At all times, either the front and center pairs of wheels exert traction on the supporting surface, as in FIG. 3, or the rear and center pairs of wheels exert traction on said surface, as in FIGS. 1 and 2. Under all conditions, the functioning four wheels ensure easy skid steering in exceedingly small areas, as well as stable and safe operation with four wheel traction in single path travel on any kind of terrain. The positive four wheel traction in a six wheel vehicle capable of efficient skid steering is obtained by mounting three pairs of wheels with minimum space between their peripheral surfaces on a vehicle frame heretofore used for two pairs of larger diameter wheels, the axle of the center pair being in a lower plane than the other axles.

Obviously dimensions may vary. One example of the invention utilizes six wheels 25 1/2 inches in diameter, the three wheels at each side being spaced peripherally one inch apart, with the center axle in a horizontal plane one inch lower than the axles of the front and rear pairs of wheels. Two adjacent pairs of wheels at all times function as a four wheel traction drive in response to the rocking motion which occurs automatically as the result of variation in load weight forwardly and rearwardly of the center axle.

I claim:

1. A skid steer loader having loader arms pivotally connected near the rear of the vehicle for operating a mechanism at the front of the vehicle, comprising
   a. a vehicle body, and
   b. three transversely extending axles being a front, a center, and a rear axle supporting said vehicle body and having a plurality of wheels arranged in pairs thereon, each wheel being near but not contacting an adjacent wheel, the front and rear axles being in a single horizontal plane that would levelly support the vehicle body, and the center axle being in a lower horizontal plane than the plane of the front and rear axles, variations in the vehicle load forwardly and rearwardly of the center axle automatically producing rocking movement of the vehicle and four wheel traction utilizing either the combination of wheels on the center and front axles or the combination of wheels on the center and rear axles bearing on a supporting surface.

* * * * *